United States Patent [19]

Thoone

[11] Patent Number: 4,628,729
[45] Date of Patent: Dec. 16, 1986

[54] ARRANGEMENT FOR DETERMINING THE INSTANTANEOUS ANGULAR POSITION OF A MOVING OBJECT

[75] Inventor: Martinus L. G. Thoone, Eindhoven, Netherlands

[73] Assignee: U.S. Philips Corporation, New York, N.Y.

[21] Appl. No.: 752,886

[22] Filed: Jul. 8, 1985

[30] Foreign Application Priority Data

Jul. 16, 1984 [NL] Netherlands .................... 8402241

[51] Int. Cl.[4] .............................................. G01C 21/00
[52] U.S. Cl. ..................................... 73/178 R; 33/366
[58] Field of Search ............. 73/178 R, 178 T, 178 H, 73/517 A, 509; 33/366, 354; 364/559, 572

[56] References Cited
U.S. PATENT DOCUMENTS 3,824,386 7/1974 Offereins ......................... 73/178 R
4,212,443 7/1980 Duncan et al. .................. 73/178 R
4,531,300 7/1985 Heidel et al. ......................... 73/505

Primary Examiner—Donald O. Woodiel
Attorney, Agent, or Firm—Robert T. Mayer; Bernard Franzblau

[57] ABSTRACT

A simple accurate arrangement for determining the instantaneous angular position of a moving object comprises rotation acceleration sensors located in reference axes of the article. Because of the double integration, the low-frequency static angular signal obtained is not reliable so that a device for measuring the static angle is used which supplies these values accurately, it is true, but which is not reliable in high-frequency respects. A correct angular signal is obtained by filter circuits and mixing. A piezoelectric element is used in the rotation acceleration sensor, while the device for measuring the static angle is an electrolytic leveling instrument.

6 Claims, 3 Drawing Figures

ARRANGEMENT FOR DETERMINING THE INSTANTANEOUS ANGULAR POSITION OF A MOVING OBJECT

This invention relates to an arrangement for determining the instantaneous angular position of a moving object in which the angle between a reference plane in the object and a vertical plane coinciding with the direction of the force of gravity is determined, for which purpose a rotational acceleration sensor is arranged in the line of intersection of the two planes. The sensor is connected to determine the high-frequency components in an angular signal proportional to the angle to be measured for feed to a first processing circuit comprising a first integrator connected to a first input of a second integrator provided with a second input, while the arrangement comprises a second sensor which is connected to determine the low-frequency components in the angular signal for feed to a second processing circuit, in which a low-pass filter is included. The arrangement further comprises a summation circuit for summing the low-frequency and high-frequency components so that an output of the arrangement delivers the said angular signal.

A determination of the angular position of an object, such as a vehicle, a vessel or an aeroplane, is of importance, for example, for stabilizing in a horizontal position a platform suspended on gimbals in the object or for accurately determining the direction in which the object moves or the position in space which the object occupies, for example expressed in coordinates.

An arrangement by which the angular position can be determined is known from U.S. Pat. No. 3,824,386.

With respect to the terrestrial surface, which is generally at right angles to the direction of the force of gravity, a rectangular coordinate system is assumed and such a system is also defined in the object. By rotation about the axes of the latter system, any position in space with respect to the terrestrial surface can be obtained. For measuring this rotation, a rotation acceleration sensor is arranged in each axis, by which the angular velocity and the angle of rotation can be found electronically by integrating once and twice in time respectively. However, in a static condition in which the angular position does not vary, the integrators should be very stable for a long time, which cannot be realized in practice. Only the data obtained by the sensor at higher frequencies are exact and are consequently very useful. In this known arrangement, it has been suggested to use additional sensors which deliver an accurate low-frequency static signal value, but which do not deliver, or deliver inaccurately, a similar high-frequency value. Thus, two angular acceleration sensors and a levelling instrument are used.

A disadvantage of this arrangement is that several complicated computers and various function generators are required. The disadvantage is related inter alia, to the fact that rotations about two or three axes mutually influence each other because a component of the force of gravity active along an axis is influenced by rotations about the other axes.

The invention is based on the idea that the circuitry can be considerably simplified if a sensor for the static angle is used which, at least in a given tolerance range, is not dependent upon the rotations about other reference axes. For this purpose, the arrangement of the kind mentioned in the opening paragraph is characterized in that the second sensor is an electrolytic levelling instrument and the second input of the second integrator is connected to an output of the second processing circuit. In addition, the output of the second integrator is connected to the output of the arrangement and to a first input of a comparison circuit included in the second processing circuit. A second input of the comparison circuit is connected to the low-pass filter which is connected to the electrolytic levelling instrument, and an output is connected to the output of the second processing circuit.

Such an arrangement is particularly suitable for use in vehicles in which the tilting angle and the elevation angle remain within given limits. Advantageously an inexpensive system is obtained which can be used for vehicle navigation. The analogue circuitry is very simple, but by means of an inexpensive analogue-to-digital converter the analogue sensor signals can be digitized and handled in a microprocessor usually already present which, in view of the simplicity of the operations required, does not require much capacity.

The electrolytic levelling instrument is known per se and is described, for example, in the "Handbook of Transducers for Electronic Measuring Systems", 1969, Prentice Hall Inc., Englewood Cliffs N.J., written by Harry N. Norton, on pages 155 and 156 and in FIGS. 2-10.

The invention will be described more fully with reference to the drawing, in which:

FIG. 1 shows an embodiment of an angle acceleration sensor, such as can be used in accordance with the invention.

Figure 1:
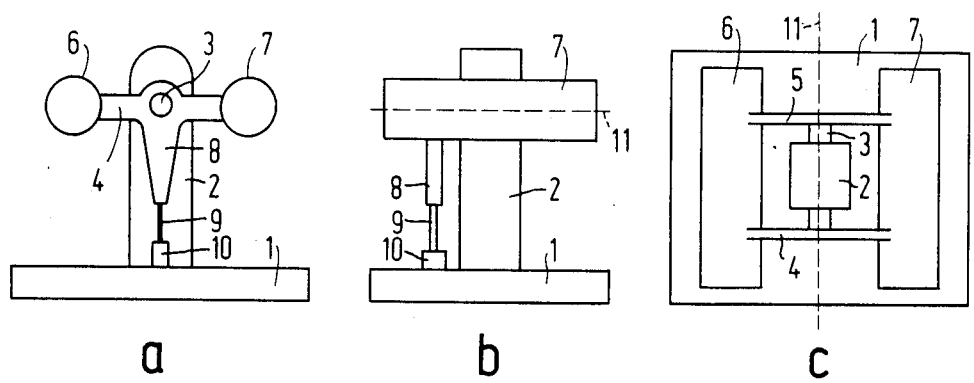
FIG. 1 shows a rotation acceleration sensor according to the invention in front view (1a), side view (1b) and top view (1c)

On a base plate 1 is secured a supporting bracket 2, in which a shaft 3 can rotate resiliently within given limits. The shaft 3 has secured to it spacer members 4 and 5, which support cylinders 6 and 7, which produce mass inertia.

The spacer member 4 has secured to it an arm 8, to which a piezo-electric strip 9 is mounted.

The other end of this strip is secured to a block 10 on the base plate 1.

When the base plate 1 moves so that the shaft 3 performs a rotation about the reference axis 11, the strip 9 will bend due to the mass inertia of the cylinders 6 and 7 which, as known, produces an electrical charge at electrodes provided on the strip, which charge is proportional to the bend and hence to the angular acceleration.

Figure 2:
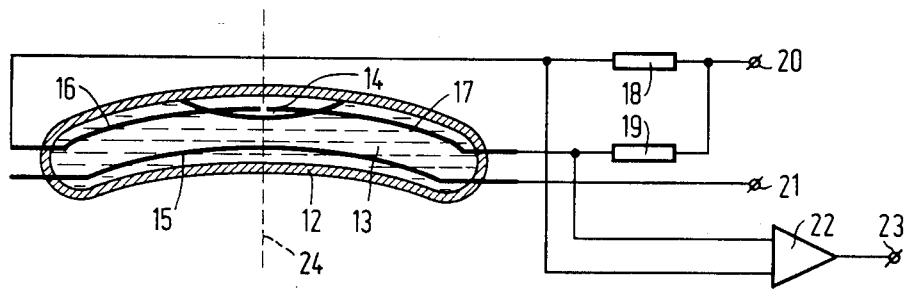
FIG. 2 shows an electrolytic levelling instrument in cross-section with some connected circuitry.

FIG. 2 shows an electrolytic levelling instrument 12 provided with an electrolyte 13, a gas bubble 14, a counterelectrode 15 and measurement electrodes 16 and 17. The electrolyte resistance between the electrodes 15 and 16 constitutes with the resistor 18 one branch of a bridge circuit. The electrolyte resistance between the electrodes 15 and 17 constitutes with the resistor 19 the other branch of the bridge circuit which is supplied from a source at terminals 20 and 21. The bridge unbalance is measured between the electrodes 16 and 17 by means of an amplifier circuit 22, which supplies to the output 23 a direct voltage proportional to the unbalance and hence to the asymmetry of the electrolyte resistances. This asymmetry depends upon the position of the gas bubble 14 and hence upon the angle the line 24 of the levelling instrument encloses with the vertical line on the terrestrial surface. In the case of an A.C. source apply to the bridge circuit, the amplifier circuit 22 comprises further rectifier circuits.

The levelling instrument 12 is not suitable to supply all information about the angle of the oblique position because the electrolyte is too mobile and will react to lateral forces and fluctuations. However, the levelling instrument supplies over a longer time, in which the electrical bridge output signal is averaged, correct information about the static angle and very slow variations of this angle.

Figure 3:
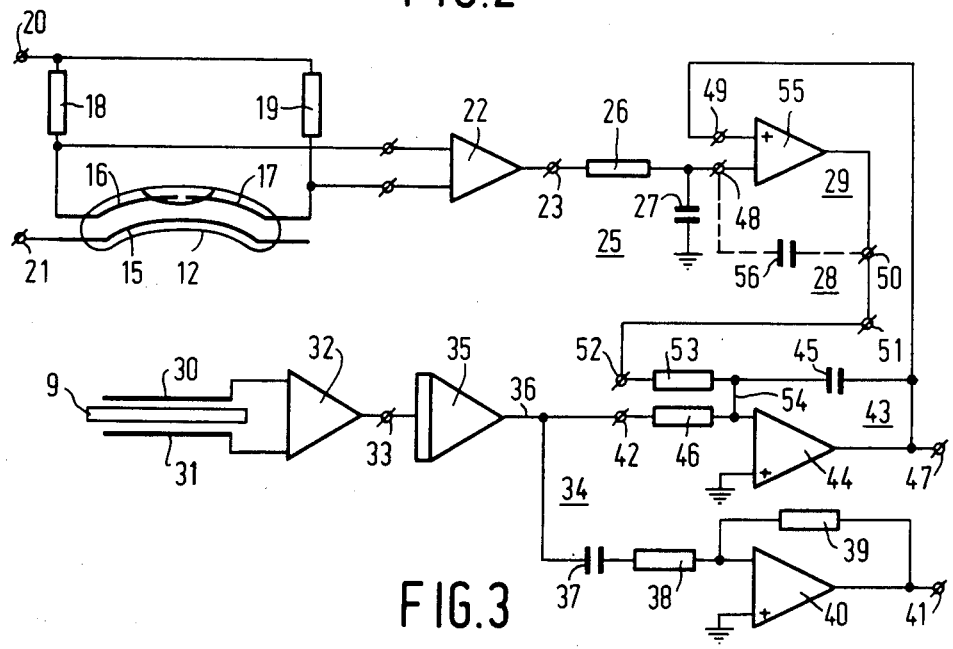
FIG. 3 shows a diagram of an arrangement according to the invention with an electrolytic levelling instrument and a piezoelectric sensor.

In FIG. 3, which shows the arrangement according to the invention, a low-pass filter 25 is connected to the levelling instrument of FIG. 2. The filter consists of resistor 26 connected to the output 23 and a capacitor 27. This filter 25 forms part of a second processing circuit 28, which also comprises a comparison circuit 29.

The piezeo-electric sensor 9 is connected by electrodes 30 and 31 to a charge amplifier 32, which supplies to the input 33 of a first processing circuit 34 a voltage proportional to the bend of the sensor strip 9. In this first processing circuit 34, the voltage is integrated in a first integrator 35 so that a signal proportional to the angular velocity is present at the output 36. When used in a vehicle it may be assumed that the latter will not rotate at a constant speed about a reference axis so that the angular velocity will contain only alternating components which can be measured via a high-pass filter. This filter is constituted by a capacitor 37 connected in series with a resistor 38, a feedback resistor 39 and an operational amplifier 40. The angular velocity signal is available at the output 41.

The output 36 is further connected to a first input 42 of a second integrator 43 comprising an operational amplifier 44, a capacitor 45 and a resistor 46. Due to this second integration, a signal proportional to the angle becomes available at the output 47. In fact this angular signal is a summation of successive angular rotations from which the angle of the oblique position is determined in that when starting the arrangement an initial condition corresponding to the angle of the oblique position is set up in the integration circuit. However, due to the presence of a device for measuring the absolute angle in the form of the levelling instrument 12, this initialising operation is not necessary. This can be seen as follows. The filtered angular signal of the levelling instrument 12 present across the capacitor 27 is supplied to a second input 48 of the comparison circuit 29, the first input 49 of which is connected to the output 47 supplying the angle signal. The output 50 of the comparison circuit 29 is connected to the output 51 of the second processing circuit 28 and the latter is in turn connected to a second input 52 of the second integrator 43. This input 52 is connected through a resistor 53 to the summation point 54. If inter alia, the amplifier 55 of the comparison circuit 29 has sufficient amplification, it may be assumed that the direct voltage and very low-frequency components at the input 48 are equal to the same quantities at the input 49. Consequently, the output 47 supplies a signal which is equal to the static angle measured by the levelling instrument 12. It will be appreciated that the output 50 constitutes with the resistor 53 a source which takes up the current which is equal to a direct voltage at the output 36 and the input 42 divided by the resistance value of the resistor 46. It is very advantageous to include the capacitor 27 of the low-pass filter 25 in the comparison circuit 29. One side of the capacitor is then not connected to ground, but is connected instead to the output 50, as is indicated by the capacitor 56. The amplifier 55 is then an operational amplifier whose amplification is very large, as is known. The direct voltage at the input 48 and hence the average static signal is now very close to the desired angular signal at the output 47. In this integrator circuit, which serves at the same time as a voltage comparator, the advantage is obtained that alternating components which are indeed desirable in the angular signal at the output 47 are supplied with amplification substantially equal to unity to the input 52, after which they are further subjected to the attenuation of the RC time constant of the resistor 53 and the capacitor 45 and thus supply a negligible negative feedback signal. In the circuit first described, this negative feedback signal is A times larger because the amplifier 55 amplifies A times, for example 100 or 1000 times.

This fact should be taken into account in the dimensioning of the RC time-constant and the frequency ranges.

What is claimed is:

1. An apparatus for determining the instantaneous angular position of a moving object in which the angle between a reference plane in the object and a vertical plane coinciding with the direction of the force of gravity is determined, comprising: a rotational acceleration sensor arranged in the line of intersection of the two planes and connected to determine the high-frequency components in an angular signal proportional to the angle to be measured for feed to a first processing circuit comprising a first integrator connected to a first input of a second integrator having a second input and an output, a second sensor connected for determining the low-frequency components in the angular signal for feed to a second processing circuit which includes a low-pass filter, a summing circuit for summing the low-frequency and high-frequency components so that an output of the apparatus supplies the said angular signal, characterized in that the second sensor comprises an electrolytic levelling instrument and the second input of the second integrator is connected to an output of the second processing circuit, means connecting the output of the second integrator to the output of the apparatus and to a first input of a comparison circuit included in the second processing circuit, and means connecting a second input of the comparison circuit to the low-pass filter which is connected to the electrolytic levelling instrument.

2. An apparatus as claimed in claim 1, wherein the comparison circuit comprises an operational amplifier, and the low-pass filter comprises a capacitor connected between the output and the second input of the comparison circuit and a resistor connected between the second input of the comparison circuit and the second sensor.

3. An apparatus for determining the instantaneous angular position of a moving object by determining the angle between a reference plane in the object and a vertical plane in the direction of the force of gravity comprising: a rotational acceleration sensor arranged in the line of intersection of the two planes for deriving a first signal determined by high-frequency components in an angular signal proportional to the angle to be determined, a first signal processing circuit comprising first and second integrators connected in cascade to an output of the acceleration sensor, a second sensor comprising an electrolytic levelling instrument for deriving a second signal determined by low-frequency components in the angular signal, a second signal processing circuit including a low-pass filter coupled to an output of the electrolytic levelling instrument, the second signal processing circuit including a comparison circuit having a first input coupled to an output of the second integrator and a second input coupled to the low-pass filter, an input of the second integrator being coupled via a summing circuit to an output of the first integrator and to an output of the comparison circuit, said summing circuit adding the first and second signals determined by the high and low frequency components in the angular signal so that said angular signal is derived at the output of the second integrator, and an output terminal of the apparatus coupled to the output of the second integrator so that the angular signal is available at said output terminal.

4. An apparatus as claimed in claim 3 wherein the low-pass filter includes a capacitor coupled between the second input of the comparison circuit and a point of reference potential.

5. An apparatus as claimed in claim 3 wherein the low-pass filter includes a capacitor coupled between the second input and the output of the comparison circuit.

6. An apparatus as claimed in claim 3 wherein the rotational acceleration sensor comprises a piezoelectric sensor, said apparatus further comprising a high-pass filter coupling the output of the first integrator to a second output terminal of the apparatus at which a signal is derived that is indicative of the angular velocity of the object.

* * * * *